United States Patent
Yamaki et al.

(10) Patent No.: US 6,202,608 B1
(45) Date of Patent: Mar. 20, 2001

(54) CONTROL SYSTEM FOR INTERNAL COMBUSTION ENGINE

(75) Inventors: Toshihiro Yamaki; Osamu Suzuki; Minoru Torii; Harumi Hatano, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/518,718

(22) Filed: Mar. 3, 2000

(30) Foreign Application Priority Data

Mar. 4, 1999 (JP) .................................................. 11-56339

(51) Int. Cl.[7] ....................................................... F01L 9/04
(52) U.S. Cl. ..................................... 123/90.11; 123/179.3; 123/198 D
(58) Field of Search ............................. 123/90.11, 179.1, 123/179.3, 198 D

(56) References Cited

U.S. PATENT DOCUMENTS 5,003,938 * 4/1991 Erickson et al. .................. 123/90.14
5,596,956 * 1/1997 Ogawa et al. ..................... 123/90.11

FOREIGN PATENT DOCUMENTS

| 8-170509 | 7/1996 | (JP) . |
| 9-195736 | 7/1997 | (JP) . |
| 9-303122 | 11/1997 | (JP) . |

* cited by examiner

*Primary Examiner*—Weilun Lo
(74) *Attorney, Agent, or Firm*—Arent Fox Kintner Plotkin & Kahn, PLLC

(57) ABSTRACT

A control system for an internal combustion engine is configured to suitably control the operation of electromagnetically driven intake valves and/or exhaust valves upon start-up of the engine for reducing the output current of a battery and suppressing a reduction in output voltage at minimum, thereby accurately operating the electromagnetically driven valves. The control system is operated such that when an ignition switch is turned on, the operation of a starter is prohibited and initial attraction for intake valves and exhaust valves is sequentially performed in such a manner that the attracting operations for the valves are not overlapped to each other; and after the initial attraction for all the valves is completed, the operation of the starter is permitted and the start-up of the engine is performed.

4 Claims, 6 Drawing Sheets

F I G. 6 A
F I G. 6 B
F I G. 6 C DECISION OF FULL-CLOSE POSITION
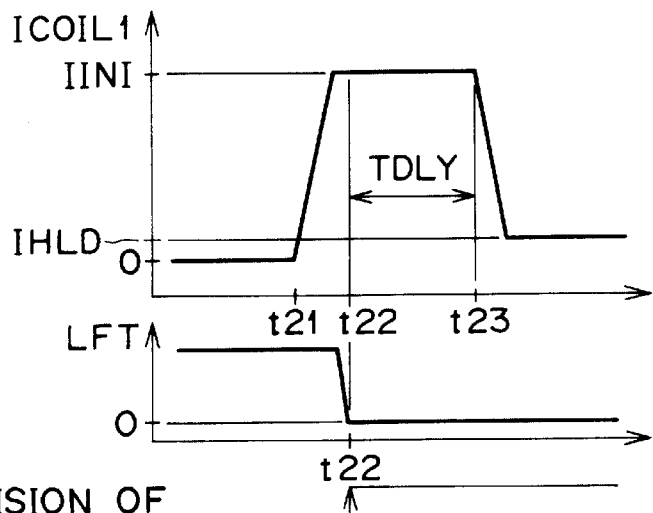
F I G. 7 A
F I G. 7 B
F I G. 7 C DECISION OF FULL-CLOSE POSITION
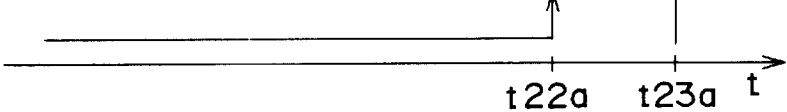

CONTROL SYSTEM FOR INTERNAL COMBUSTION ENGINE

BACKGROUND OF THE INVENTION

The present invention relates to a control system for an internal combustion engine, and particularly to a control system for an internal combustion engine including electromagnetically driven intake valves and/or exhaust valves.

A control system for an internal combustion engine including intake valves and exhaust valves in each of which a valve body is electromagnetically driven by a spring and solenoids, characterized in that power consumption caused by operation of the solenoids upon start-up of the engine is reduced by making use of the resonance phenomenon of the spring, has been known, typically, from Japanese Patent Laid-open No. Hei 9-195736. Such a reduction in power consumption caused by operation of the solenoids is effective because, upon start-up of the engine, a power for operating the electromagnetically driven valve, which is supplied from only a battery because no power is supplied from an alternator thereto, is required to be made as small as possible. Another control system of the type making use of the resonance phenomenon, characterized in that a drive starting timing of a valve is determined depending on a crank angle position in order to prevent interference between the valve and a piston upon start-up of an engine, has been known, for example, in Japanese Patent Laid-open No. Hei 9-303122.

A further control system of a type in which initial attraction for closing all of electromagnetically driven intake valves and exhaust valves is executed before start-up of an engine and then the start-up of the engine is permitted in order to prevent interference between the valves and pistons, has been disclosed in Japanese Patent Laid-open No. Hei 8-170509.

The control system disclosed in Japanese Patent Laid-open No. Hei 9-195736 or Japanese Patent Laid-open No. Hei 9-302122 is advantageous in reducing the power consumption by making use of the resonance phenomenon of the spring; however, such a control system is disadvantageous in that since the operation of the valves is started while the starter is operated, the output current of the battery is increased, and accordingly, if the battery is degraded, the output voltage is reduced, to cause a possibility that it fails to certainly start up the engine.

The control system disclosed in Japanese Patent Laid-open No. Hei 8-170509 is advantageous in that since the closing operation, that is, the initial attraction for the valves is executed before the cranking of the engine is started, the initial attraction is not overlapped to the operation of the starter; however, such a control system is disadvantageous in that since all the valves are simultaneously closed, the output current of the battery is temporarily abruptly increased, and accordingly, the output voltage is reduced, to cause a possibility that it fails to sufficiently perform the initial attraction.

SUMMARY OF THE INVENTION

An object of the present invention is to provide a control system for an internal combustion engine, which is capable of suitably controlling the operation of electromagnetically driven intake valves and/or exhaust valves upon start-up of the engine, to reduce the output current of a battery and suppress a reduction in output voltage at minimum, thereby accurately operating the electromagnetically driven valves.

To achieve the above object, according to the present invention, there is provided a control system for an internal combustion engine including an electromagnetic drive means for electromagnetically opening/closing intake valves and/or exhaust valves of the engine, the control system comprising: a start-up signal detecting means for detecting a start-up signal for starting up the engine; and an initial attraction executing means for sequentially executing initial attraction for a plurality of valves driven by the electromagnetic drive means in such a manner that the attracting operations for the valves are not overlapped to each other; wherein the start-up of the engine is performed after the initial attraction for all of the valves driven by the electromagnetic drive means is completed.

With this configuration, after a start-up signal is detected, the initial attraction for a plurality of valves driven by the electromagnetic drive means is sequentially executed in such a manner that the attracting operations for the valves are not overlapped to each other, and the start-up of the engine is performed after the initial attraction for all of the valves driven by the electromagnetic drive means is completed. This is effective to reduce the maximum consumption current caused by the initial attraction for the valves and suppress a reduction in output voltage of a battery at minimum, and hence to accurately operate the electromagnetically driven valves. As a result, even if the battery is slightly degraded, both the initial attraction and the start-up of the engine can be certainly executed.

The above control system, preferably, further includes a valve position detecting means for detecting the position of each of the valves driven by the electromagnetic drive means; wherein when a specific time has elapsed after the full-close state or full-open state of the valve is detected by the valve position detecting means, it is determined that the initial attraction is completed.

Here, the term "specific time" is defined as a time required for stabilizing the state of a valve driven by the electromagnetic drive means after the valve body of the valve is electromagnetically moved from the neutral position to the full-close position or full-open position, and is experimentally determined.

With this configuration, when the specific time has elapsed after the full-close state or full-open state of the valve is detected by the valve position detecting means, it is determined that the initial attraction is completed. Accordingly, an initial attraction current is held for the specific time after the state of the valve is shifted to the full-close state or full-open state, with a result that it is possible to certainly perform the initial attraction.

The control system is also, preferably, configured such that a current supplied to the electromagnetic drive means is reduced when it is determined that the initial attraction for each of the valves is completed.

In the control system, preferably, the electromagnetic drive means includes a valve opening coil for driving each of the valves in the valve opening direction, a valve closing coil for driving the valve in the valve closing direction, and a spring for supporting the valve; and the electromagnetic drive means is configured to execute the initial attraction by shifting the state of the valve to the full-close state or full-open state by making use of the natural vibration of a vibration system composed of the valve and the spring.

BRIEF DESCRIPTION OF THE DRAWINGS

FIGS. 6A to 6C are time charts illustrating the initial attraction procedure shown in FIG. 4; and FIGS. 7A to 7C are time charts illustrating an initial attraction procedure different from that shown in FIGS. 6A to 6C.

DETAILED DESCRIPTION OF THE PREFERRED EMBODIMENT

Hereinafter, one embodiment of the present invention will be described with reference to the drawings.

Figure 1:
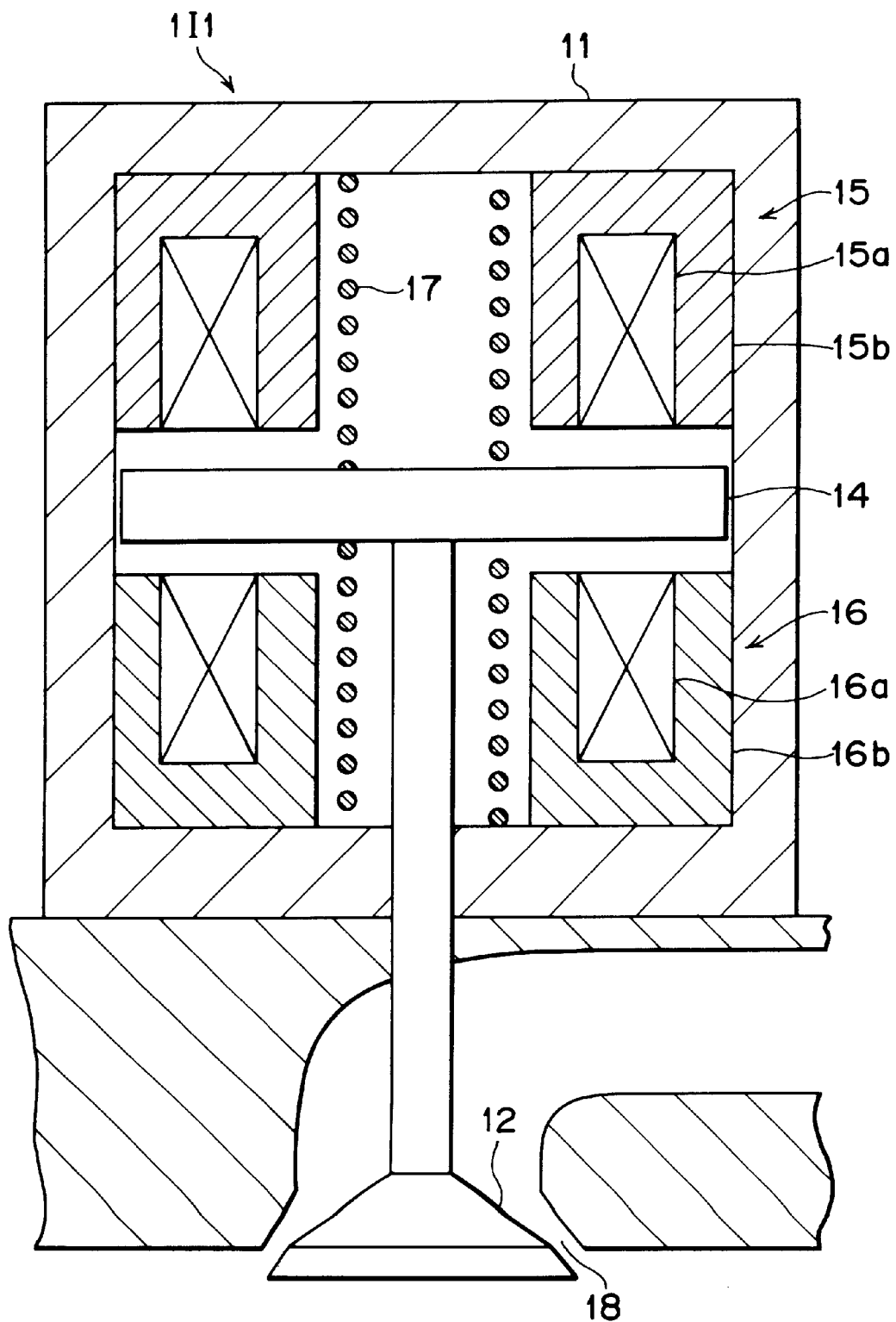
FIG. 1 is a sectional view showing the structure of an electromagnetically driven intake valve according to one embodiment of the present invention.
Figure 2:
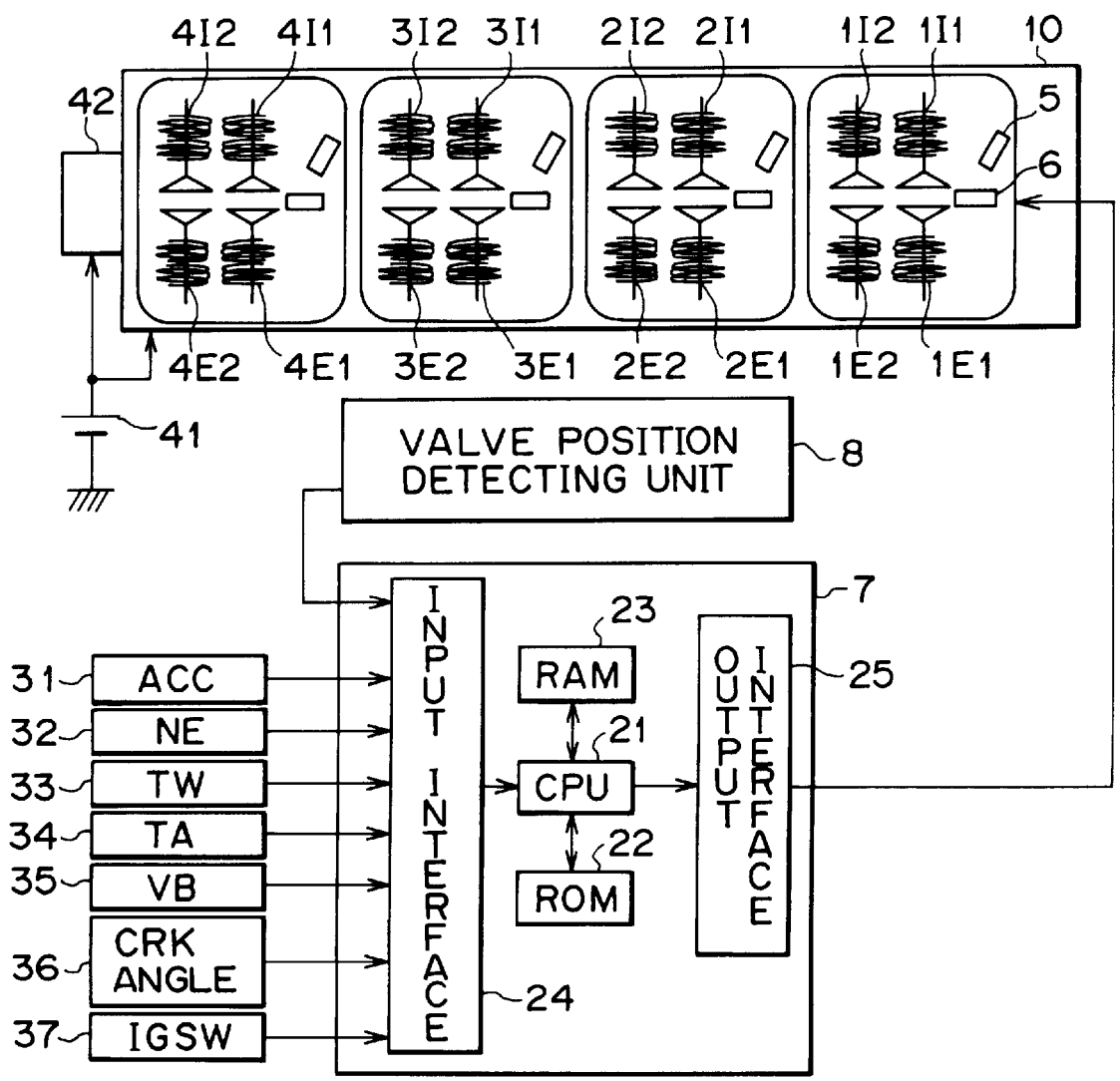
FIG. 2 is a diagram showing an internal combustion engine including electromagnetically driven intake valves and exhaust valves, and the configuration of a control system thereof.

FIG. 1 is a sectional view showing the structure of an electromagnetically driven intake valve of an internal combustion engine (hereinafter, referred to as "engine") according to one embodiment of the present invention, and FIG. 2 is a diagram showing an engine 10 including electromagnetically driven intake valves and exhaust valves, and the configuration of a control system for the engine 10. The engine 10 in this embodiment has four cylinders each having two electromagnetically driven intake valves and two electromagnetically driven exhaust valves. To be more specific, the #1 cylinder has two intake valves 1I1 and 1I2 and two exhaust valves 1E1 and 1E2; the #2 cylinder has two intake valves 2I1 and 2I2 and two exhaust valves 2E1 and 2E2; the #3 cylinder has two intake valves 3I1 and 3I2 and two exhaust valves 3E1 and 3E2; and the #4 cylinder has two intake valves 4I1 and 4I2 and two exhaust valves 4E1 and 4E2.

FIG. 1 shows the configuration of the intake valve 1I1. While not shown, the configurations of the other intake valves and exhaust valves are each the same as that shown in FIG. 1. The intake valve 1I1, which is composed of a valve element 12 to which an armature 14 is fixed and an actuator 11 for driving the armature 14, is mounted to an upper portion of a combustion chamber for opening/closing an intake port 18 of the combustion chamber of the engine 10. Each of the exhaust valves 1E1, 1E2, and the like has the same structure, and is mounted to an upper portion of the combustion chamber for opening/closing an exhaust port of the combustion chamber.

The actuator 11 mainly includes two opposed solenoids (electric magnets), that is, a valve closing solenoid 15 for biasing the valve element 12 in the valve closing direction and a valve opening solenoid 16 for biasing the valve element 12 in the valve opening direction, and a spring 17. The valve closing solenoid 15 is composed of a coil 15a and a magnetic body 15b, and the valve opening solenoid 16 is composed of a coil 16a and a magnetic body 16b. The spring 17 does not bias the valve element 12 when the armature 14 is located at a neutral position shown in FIG. 1; biases the valve element 12 in the valve opening direction when the armature 14 is located at a position higher than the neutral position; and biases the valve element 12 in the valve closing direction when the armature 14 is located at a position lower than the neutral position.

With this configuration, by exciting the valve closing solenoid 15 or the valve opening solenoid 16, the valve element 12 is moved between the full-close position at which the valve element 12 closes the intake port 18 and the full-open position at which the lift amount of the valve element 12 is maximized. When the solenoids 15 and 16 are not excited, the valve element 12 is located at the neutral position between the full close position and the full-open position.

The actuators 11 for the intake valves 1I1 to 4I2 and the exhaust valves 1E1 to 4E2 are connected to an electronic control unit (hereinafter, referred to as "ECU") 7, and the operations of the actuators 11 are controlled by the ECU 7. The control system also includes a valve position detecting unit 8 composed of position sensors for detecting positions of the valve bodies 12 of the intake valves 1I1 to 4I2 and the exhaust valves 1E1 to 4E2. The valve position detecting unit 8 is connected to the ECU 7, and a detection signal from the valve position detecting unit 8 is supplied to the ECU 7. The position sensor is configured as an eddy current type sensor or a sensor of a type detecting a change in inductance.

A drive power for driving each actuator 11 is supplied from a battery 41. The battery 41 is connected to a starter 42 for rotating the engine 10 upon start-up of the engine 10 to supply a drive power to the starter 42.

A fuel injection valve 5 is mounted to an intake manifold provided for each cylinder of the engine 10, and an ignition plug 6 is mounted to a combustion chamber of each cylinder. The fuel injection valves 5 and the ignition plugs 6 are connected to the ECU 7 and the operations of the fuel injection valves 5 and the ignition plugs 7 are controlled by the ECU 7.

Connected to the ECU 7 are various sensors such as an accelerator opening sensor 31 for detecting an accelerator pedal depressed amount (hereinafter, referred to as "accelerator opening") as a parameter indicating a driver's required load (required output) for the engine 10; an engine rotational speed sensor 32 for detecting the engine rotational speed NE; an engine water temperature sensor 33 for detecting an engine cooling water temperature TW; an intake air temperature sensor 34 for detecting an intake air temperature TA; a battery voltage sensor 35 for detecting a battery voltage VB; and a crank angle position sensor 36 for detecting the rotational angle of a crank shaft; and various switches such as an ignition switch 37. Detection signals of the sensors and switching signals of the switches are supplied to the ECU 7. The crank angle position sensor 36 is composed of a cylinder decision sensor for outputting a signal pulse at a predetermined crank angle position of a specific cylinder of the engine 10 (hereinafter, referred to as "CYL signal pulse"); a TDC sensor for outputting a TDC signal pulse at a crank angle position which corresponds to a predetermined crank angle before a top dead center (TDC) upon starting the intake stroke of each cylinder (for each crank angle of 180° in the case of the four-cylinder engine); and a CRK sensor for generating one pulse at a specific crank angle cycle shorter than that of the TDC signal pulse, for example, a cycle of 30° (hereinafter, referred to as "CRK signal pulse"). The CYL signal pulse, TDC signal pulse, and the CRK signal pulse are supplied to the ECU 7. These signal pulses are used for control of various timings such as a fuel injection timing or an ignition timing.

The ECU 7 includes an input interface 24 to which the various sensors and switches are connected and which has functions of shaping the waveform of an input signal, correcting a voltage level to a specific level, and converting an analog signal value into a digital signal value; a central processing unit (hereinafter, referred to as "CPU") 21; a ROM (Read Only Memory) 22 and a RAM (Random Access Memory) 23 for storing various computing programs to be executed by the CPU 21 and the computed results; and an output interface 7 for supplying drive signals for the actuators 11 for driving the intake valves and exhaust valves, the fuel injection valves 5, and the ignition plugs 6.

Figure 3:
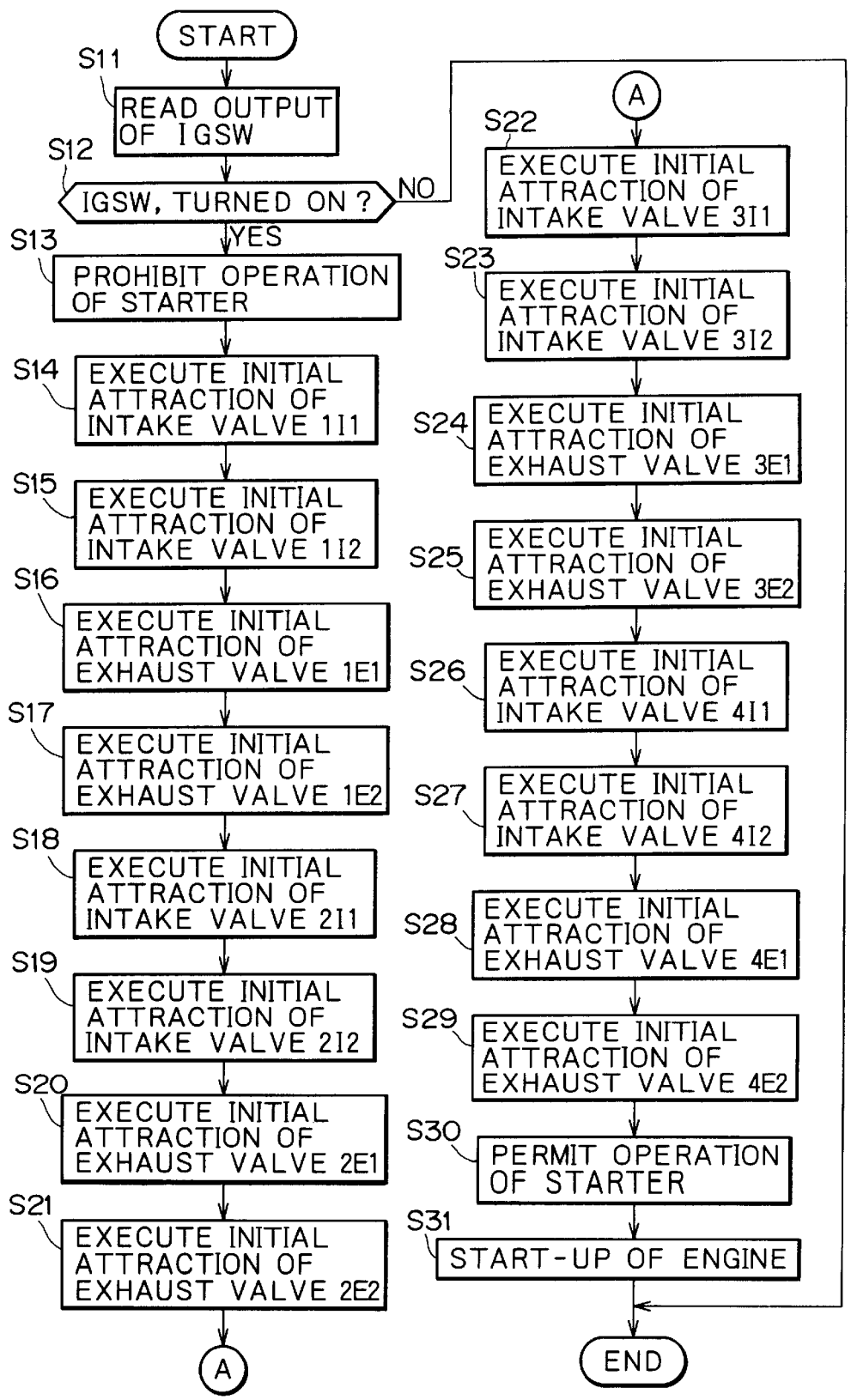
FIG. 3 is a flow chart showing a control procedure upon start-up of the engine.

FIG. 3 is a flow chart illustrating a control procedure upon start-up of the engine 10. The control is executed by the CPU 21 of the ECU 7.

First, the output of the ignition switch 37 is read out (step S11), and it is determined whether or not the ignition switch 37 is turned on (step S12). If it is determined that the ignition switch 37 is not turned on, the start-up of the engine 10 is not performed.

If it is determined that the ignition switch 37 is turned on, the operation of the starter 42 for rotating the engine 10 is prohibited (step S13). Then, the initial attraction for each of the valves, that is, the movement of each of the valve bodies 12 to the full-close position is sequentially executed in the order from the intake valves 1I1 and 1I2 and exhaust valves 1E1 and 1E2 of the #1 cylinder to the intake valves 4I1 and 4I2 and exhaust valves 4E1 and 4E2 of the #4 cylinder (step S14 to step S29). At this time, the initial attraction for the valves is executed such that the attracting operations are not overlapped to each other. To be more specific, the initial attraction for the valves is controlled such that the initial attraction executing periods for the valves are not overlapped to each other. For example, the initial attraction for the intake valve 1I2 begins after the initial attraction for the intake valve 1I1 is completed, and the initial attraction for the exhaust valve 1E1 begins after the initial attraction for the intake valve 1I2 is completed.

When the initial attraction for all the valves is completed, the operation of the starter 42 is permitted (step S30), and the engine 10 is started up, that is, the cranking of the engine 10 is started (step S31).

Figure 4:
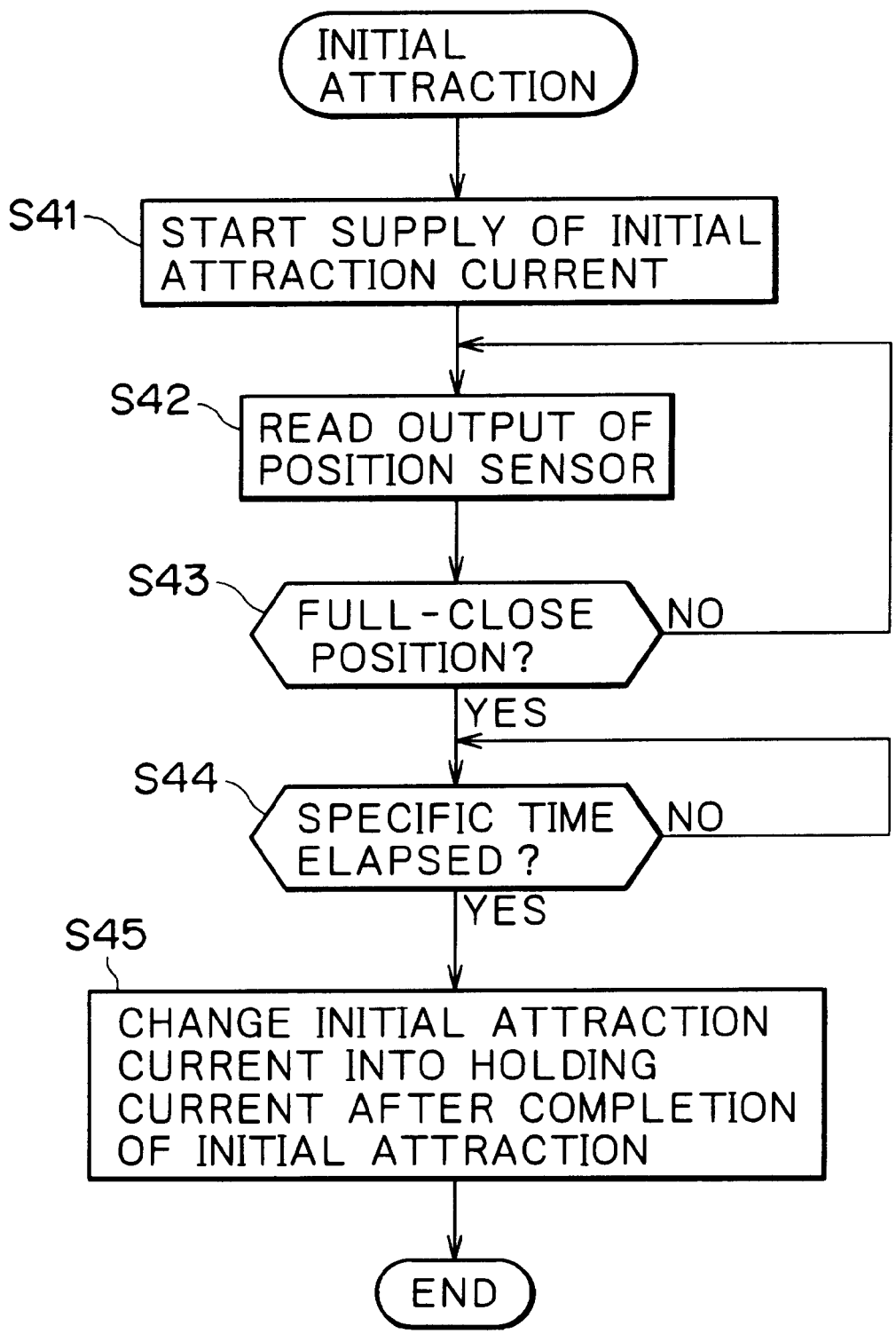
FIG. 4 is a flow chart showing an initial attraction procedure for the intake valves and exhaust valves.
Figure 5:
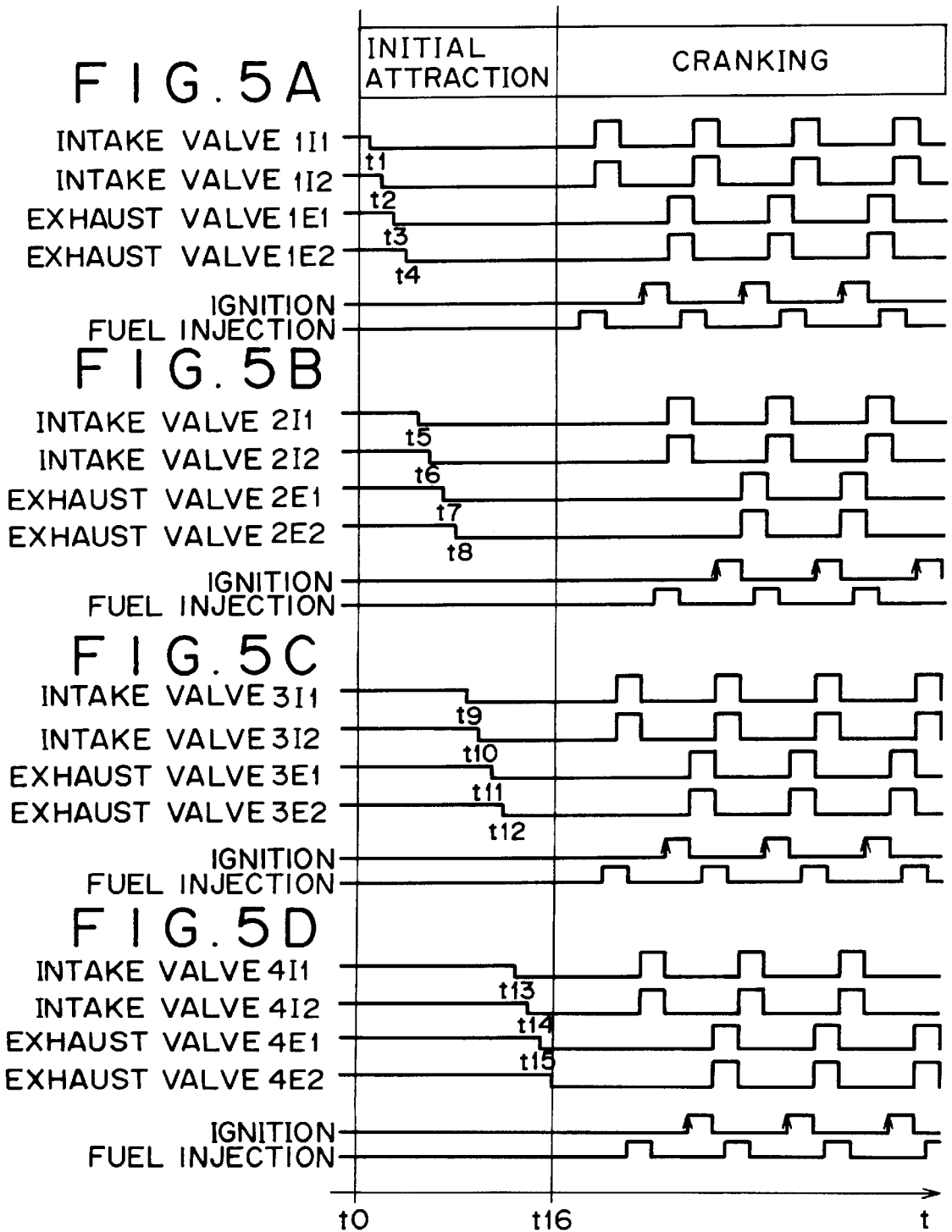
FIGS. 5A to 5D are time charts illustrating the control procedure shown in FIG. 3.

The initial attraction for the valves shown in FIG. 3 is controlled by the CPU 21 as shown in FIG. 4. First, the supply of an initial attraction current IINI to the coil 15a of the valve closing solenoid 15 begins (step S41). The output of the corresponding position sensor of the valve position detecting unit 8 is read out (step S42), and it is determined whether or not the valve element 12 reaches the full-close position (step S43). If it is determined that the valve element 12 reaches the full-close position, the supply of the initial attraction current is continued until a specific time TDLY elapses after the valve element 12 reaches to the full-close position (step S44). When the specific time TDLY has elapsed, it is determined that the initial attraction is completed, and the initial attraction current IINI is changed into a holding current IHLD smaller than the initial attraction current IINI (step S45).

FIGS. 5A to 5D are time charts illustrating the control procedure shown in FIG. 3. When the ignition switch 37 is turned on at a time t0, the intake valve 1I1 is full-closed at a time t1; the intake valve 1I2 is full-closed at a time t2 slightly later than a time when the specific time TDLY has elapsed since the time t1; the exhaust valve 1E1 is full-closed at a time t3 slightly later than a time when the specific time TDLY has elapsed since the time t2; and the exhaust valve 1E2 is full-closed at a time t4 slightly later than a time when the specific time TDLY has elapsed since the time t3. By repeating the above valve closing operation, the remaining intake valves and exhaust valves are sequentially full-closed at times t5 to t16. At the time t16 at which the exhaust valve 4E2 is full-closed, the operation of the starter 42 is permitted and the cranking of the engine 10 is started.

In the example shown in FIGS. 5A to 5D, fuel injection and the subsequent intake, compression, expansion and exhaust strokes are repeated in the order of #1 cylinder, #3 cylinder, #4 cylinder, and #2 cylinder. In FIG. 5, a time shown by an upwardly directing arrow designates the ignition execution timing.

FIGS. 6A to 6C are time charts illustrating the control procedure shown in FIG. 4. FIG. 6A shows the transition of a current ICOIL1 flowing in the coil 15a, and FIG. 6B shows the transition of a valve lift amount LFT. When the supply of the current begins at a time t21, the coil current ICOIL1 reaches the initial attraction current IINI at a time slightly later than the time t21; and at a time t22, it is detected that the valve element 12 reaches the full-close position by the output of the position sensor; and the initial attraction current IINI is held for the specific time TDLY from the time t22. At a time t23 later than the time t22 by the specific time TDLY, it is determined that the initial attraction is completed, and the initial attraction current IINI is changed into the holding current IHLD. As a result, at a time slightly later than the t23, the coil current ICOIL1 is reduced to the holding current IHLD.

By holding the initial attraction current IINI for the specific time TDLY after the valve element 12 reaches the full-close position, the initial attraction can be certainly executed. Here, the specific time TDLY is defined as a time required for stabilizing the state of the valve element 12 driven by the actuator 11 after the valve element 12 is moved from the neutral position to the full-closed position, and is set at, for example, about 20 msec.

As described above, the embodiment of the present invention is configured such that immediately after the ignition switch 37 is turned on, the operation of the starter 42 is prohibited and the initial attraction for the valves is controlled such that the initial attraction executing periods for the valves are not overlapped to each other. Accordingly, it becomes possible to lower the peak valve of the output current of the battery 41, and hence to suppress a reduction in battery voltage VB at minimum. As a result, even if the battery 41 is slightly degraded, it is possible to certainly execute both the initial attraction and the start-up of the engine.

In this embodiment, the actuator 11 is equivalent to the electromagnetic drive means and the valve position detecting unit 8 is equivalent to the valve position detecting means. The control procedures shown in FIGS. 3 and 4 executed by the CPU 21 of the ECU 7 are equivalent to the control procedures performed by the control system including the start-up signal detecting means for detecting a start-up signal for starting up the engine; and the initial attraction executing means for sequentially executing initial attraction for a plurality of valves driven by the electromagnetic drive means in such a manner that the attracting operations for the valves are not overlapped to each other; wherein the start-up of the engine is performed after the initial attraction for all of the valves driven by the electromagnetic drive means is completed.

The present invention is not limited to the above-described embodiment, and it is to be understood that variations may be made without departing from the scope of the present invention. For example, in this embodiment, the relatively large initial attraction current IINI is supplied to the coil 15a as shown in FIG. 6 for executing initial attraction; however, the valve element 12 may be moved to the full-close position by supplying a coil current ICOIL2 shown in FIG. 7A to the valve opening coil 16a while supplying a coil current ICOIL1 shown in FIG. 7B to the valve closing coil 15a, thereby making use of natural vibration of a vibration system composed of the spring 17 and the valve element 12. In this case, at a time t22a, the full-close position is detected, and at a time t23a later than the time t22a by the specific time TDLY, an initial attraction current IINIa (<IINI) is changed into the holding current IHLD. With this configuration, it is possible to reduce the coil current and hence to further reduce the output current of the battery 41.

In the above embodiment, the initial attraction is performed by moving the valve element 12 from the neutral position to the full-close position, thereby shifting the state of the valve into the full-close state; however, if the valve has a structure having no interference between the piston and the valve body, the initial attraction may be performed by moving the valve body from the neutral position to the full-open position, thereby shifting the state of the valve into the full-open state.

Further, the order of executing the initial attraction is not limited to that described in the embodiment insofar as the attracting operations for two or more of the valves are not overlapped to each other.

In the embodiment, description has been made by way of the example in which the intake valves and exhaust valves of the four-cylinder engine are electromagnetically driven; however, the present invention is not limited thereto, but can be applied to the engine in which the number of the cylinders is not four, and also applied to the engine in which either the intake valves or the exhaust valves are electromagnetically driven insofar as two or more of electromagnetically driven valves are provided.

While the preferred embodiment has been described using the specific terms, such description is for illustrative purposes only, and it is to be understood that changes and variations may be made without departing from the spirit or scope of the following claims.

What is claimed is:

1. A control system for an internal combustion engine including an electromagnetic drive means for electromagnetically opening/closing intake valves and/or exhaust valves of said engine, said control system comprising:
    a start-up signal detecting means for detecting a start-up signal for said engine; and
    an initial attraction executing means for sequentially executing initial attraction for a plurality of valves driven by said electromagnetic drive means in such a manner that the attracting operations for said valves are not overlapped to each other;
    wherein the start-up of said engine is performed after the initial attraction for all of said valves driven by said electromagnetic drive means is completed.

2. A control system for an internal combustion engine according to claim 1, further comprising:
    a valve position detecting means for detecting the position of each of said valves driven by said electromagnetic drive means;
    wherein when a specific time has elapsed after the full-close state or full-open state of said valve is detected by said valve position detecting means, it is determined that said initial attraction is completed.

3. A control system for an internal combustion engine according to claim 1 or 2, wherein a current supplied to said electromagnetic drive means is reduced when it is determined that said initial attraction for each of said valves is completed.

4. A control system for an internal combustion engine according to claim 1 or 2, wherein said electromagnetic drive means comprises a valve opening coil for driving each of said valves in the valve opening direction, a valve closing coil for driving said valve in the valve closing direction, and a spring for supporting said valve; and
    said electromagnetic drive means is configured to execute said initial attraction by shifting the state of said valve to the full-close state or full-open state by making use of the natural vibration of a vibration system composed of said valve and said spring.

* * * * *